United States Patent
Akiyama et al.

(10) Patent No.: US 10,186,708 B2
(45) Date of Patent: Jan. 22, 2019

(54) METHOD OF MANUFACTURING NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Naohisa Akiyama, Nagoya (JP); Masanori Kitayoshi, Toyota (JP); Takashi Miura, Nisshin (JP); Yukiko Hori, Miyoshi (JP); Masashi Ueda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 19 days.

(21) Appl. No.: 15/280,360

(22) Filed: Sep. 29, 2016

(65) Prior Publication Data

US 2017/0098854 A1     Apr. 6, 2017

(30) Foreign Application Priority Data

Oct. 5, 2015  (JP) .................... 2015-197857

(51) Int. Cl.
| | |
|---|---|
| *H01M 4/62* | (2006.01) |
| *H01M 4/505* | (2010.01) |
| *H01M 4/525* | (2010.01) |
| *H01M 4/1391* | (2010.01) |
| *H01M 10/0568* | (2010.01) |
| *H01M 10/0569* | (2010.01) |
| *H01M 4/04* | (2006.01) |
| *H01M 4/131* | (2010.01) |

(Continued)

(52) U.S. Cl.
CPC ......... *H01M 4/622* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/623* (2013.01); *H01M 10/0525* (2013.01); *H01M 10/0568* (2013.01); *H01M 10/0569* (2013.01); *H01M 10/446* (2013.01); *H01M 2300/0028* (2013.01)

(58) Field of Classification Search
CPC ......... H01M 10/0431; H01M 10/0568; H01M 10/0569; H01M 10/446; H01M 2300/0037; H01M 4/1391; H01M 4/505; H01M 4/525; H01M 4/622; H01M 4/623; H01M 4/625

See application file for complete search history.

(56) References Cited

U.S. PATENT DOCUMENTS

| | | | |
|---|---|---|---|
| 2010/0216017 A1* | 8/2010 | Saito ................. | H01M 4/587 429/199 |
| 2010/0233550 A1* | 9/2010 | Yanagida ............ | H01M 4/364 429/338 |

(Continued)

FOREIGN PATENT DOCUMENTS

| | | |
|---|---|---|
| JP | 2014-103098 A | 6/2014 |
| JP | 2016-081738 A | 5/2016 |

*Primary Examiner* — Alix E Eggerding
(74) *Attorney, Agent, or Firm* — Sughrue Mion, PLLC

(57) ABSTRACT

A method of manufacturing a nonaqueous electrolyte secondary battery includes: a first step of preparing a positive electrode mixture paste; and a second step of preparing a positive electrode. In the first step, at least one binder including an acidic binder in an amount set such that a pH value of an aqueous solution obtained by dissolving the set amount of acidic binder in the same amount of water as that of the solvent is within a range of 1.7 to 5.5 is used.

6 Claims, 5 Drawing Sheets

(51) Int. Cl.
*H01M 10/0525* (2010.01)
*H01M 10/44* (2006.01)

(56) References Cited

U.S. PATENT DOCUMENTS

| | | | |
|---|---|---|---|
| 2010/0323235 A1* | 12/2010 | Takami | H01M 2/027 |
| | | | 429/158 |
| 2013/0034651 A1* | 2/2013 | Buqa | H01M 4/622 |
| | | | 427/58 |
| 2015/0132647 A1* | 5/2015 | Kato | H01M 4/62 |
| | | | 429/217 |
| 2015/0180036 A1 | 6/2015 | Takebayashi | |
| 2016/0111713 A1 | 4/2016 | Yamazaki et al. | |

* cited by examiner

METHOD OF MANUFACTURING NONAQUEOUS ELECTROLYTE SECONDARY BATTERY

INCORPORATION BY REFERENCE

The disclosure of Japanese Patent Application No. 2015-197857 filed on Oct. 5, 2015 including the specification, drawings and abstract is incorporated herein by reference in its entirety.

BACKGROUND

1. Technical Field

The present disclosure relates to a method of manufacturing a nonaqueous electrolyte secondary battery.

2. Description of Related Art

In a nonaqueous electrolyte secondary battery, in a case where the potential of a positive electrode active material (equivalent to the potential of a positive electrode) increases due to initial charging or the like, a solvent of a nonaqueous electrolytic solution is oxidized and decomposed on a surface of the positive electrode active material, and hydrogen ions produced by the oxidative decomposition may react with fluorine ions in the nonaqueous electrolytic solution to produce hydrofluoric acid (HF). Due to the action of the hydrofluoric acid, a transition metal is eluted from the positive electrode active material, and the performance of the battery may deteriorate.

On the other hand, Japanese Patent Application Publication No. 2014-103098 (JP 2014-103098 A) discloses a technique of adding lithium phosphate to a positive electrode mixture layer such that hydrofluoric acid produced as described above is caused to react with lithium phosphate ($Li_3PO_4$) to reduce the amount of the hydrofluoric acid and thereby to reduce the elution of a transition metal from a positive electrode active material. Specifically, in JP 2014-103098 A, a positive electrode mixture paste is prepared by kneading (stirring) a positive electrode active material, a conductive material, a neutral binder, lithium phosphate, and a solvent. The prepared positive electrode mixture paste is applied to a current collector member and is dried. As a result, a positive electrode that includes a positive electrode mixture layer containing lithium phosphate is prepared.

SUMMARY

However, in the preparation method disclosed in JP 2014-103098 A, the degree to which lithium phosphate is dispersed in the positive electrode mixture layer may not be improved. Specifically, for example, during the preparation of a positive electrode mixture paste, particles of lithium phosphate may aggregate (or aggregated lithium phosphate particles may not separate from each other) such that the dispersibility of lithium phosphate in the positive electrode mixture paste deteriorates and thus the degree to which lithium phosphate is dispersed in the positive electrode mixture layer may deteriorate. In a case where the kneading (stirring) energy for the positive electrode mixture paste is increased in order to improve the dispersibility of lithium phosphate, the positive electrode active material may crack. Therefore, the method of increasing the kneading (stirring) energy to improve the dispersibility of lithium phosphate cannot be adopted.

In a case where the degree to which lithium phosphate is dispersed in a positive electrode mixture layer is poor (lithium phosphate is not uniformly dispersed in the positive electrode mixture layer), lithium phosphate cannot be caused to appropriately react with hydrofluoric acid produced from surfaces of many positive electrode active material particles which are dispersed in the entire region of the positive electrode mixture layer. Thus, the elution of a transition metal from the positive electrode active material may not be appropriately prevented.

The disclosure provides a method of manufacturing a nonaqueous electrolyte secondary battery capable of improving the degree to which lithium phosphate is dispersed in a positive electrode mixture layer.

According to a first aspect of the disclosure, there is provided a method of manufacturing a nonaqueous electrolyte secondary battery, the method including: preparing a positive electrode mixture paste by kneading a positive electrode active material, a conductive material, a solvent, at least one binder, and lithium phosphate, the at least one binder including an acidic binder in an amount set such that a pH value of an aqueous solution obtained by dissolving the set amount of acidic binder in the same amount of water as that of the solvent is within a range of 1.7 to 5.5; preparing a positive electrode including a positive electrode mixture layer formed on a surface of a current collector member by applying the positive electrode mixture paste to the surface of the current collector member and drying the positive electrode mixture paste; constructing the nonaqueous electrolyte secondary battery by accommodating the positive electrode, a negative electrode, and a nonaqueous electrolytic solution containing a fluorine-containing compound in a battery case; and charging the nonaqueous electrolyte secondary battery.

In the above-described method of manufacturing a nonaqueous electrolyte secondary battery, when preparing the positive electrode mixture paste, the at least one binder including the acidic binder are used. In other words, a portion of the at least one binder used during the preparation of the positive electrode mixture paste is the acidic binder.

In this way, by adding the acidic binder during the preparation of the positive electrode mixture paste, the acidic binder can make at least a portion of the lithium phosphate dissolve in a liquid of the positive electrode mixture paste. By adjusting at least a portion of the lithium phosphate to dissolve in the liquid, the dispersibility of the lithium phosphate in the positive electrode mixture paste can be improved. As a result, the degree to which the lithium phosphate is dispersed in the positive electrode mixture layer, which is formed by drying the positive electrode mixture paste, can be improved.

However, as the addition amount of the acidic binder becomes excessively large, the internal resistance (IV resistance) of the nonaqueous electrolyte secondary battery may increase. The reason for this is presumed that, in a case where the addition amount of the acidic binder is excessively large, a transition metal is eluted from the positive electrode active material, and thus the internal resistance (IV resistance) of the battery increases.

On the other hand, in the above-described method, the addition amount of the acidic binder during the preparation of the positive electrode mixture paste corresponds to the amount (corresponding amount) set such that a pH value of an aqueous solution obtained by dissolving the set amount of acidic binder in the same amount of water as that of the solvent is within a range of 1.7 to 5.5. In other words, the acidic binder is added during the preparation of the positive electrode mixture paste in an amount set such that a pH value of an aqueous solution obtained by dissolving the set amount of acidic binder in the same amount of water as that of the solvent is within a range of 1.7 to 5.5.

By adjusting the addition amount of the acidic binder as described above (such that the value in terms of pH does not fall below 1.7), the elution of a transition metal from the positive electrode active material can be reduced, and the internal resistance (IV resistance) of the nonaqueous electrolyte secondary battery can be reduced. As the addition amount of the acidic binder increases, the value in terms of pH decreases.

On the other hand, in a case where the addition amount of the acidic binder is excessively small, the dispersibility of lithium phosphate in the positive electrode mixture paste may not be appropriately improved. On the other hand, in the above-described method, the acidic binder is added in an amount in which the value in terms of pH is 5.5 or lower. As a result, the dispersibility of lithium phosphate in the positive electrode mixture paste can be reliably improved.

Accordingly, when charging of the above-described nonaqueous electrolyte secondary battery, the solvent of the nonaqueous electrolytic solution is oxidized and decomposed on a surface of the positive electrode active material, and in a case where hydrogen ions produced by the oxidative decomposition react with fluorine ions in the nonaqueous electrolytic solution to produce hydrofluoric acid (HF), the probability that the produced hydrofluoric acid and lithium phosphate react with each other can be improved, and the amount of the produced hydrofluoric acid can be effectively reduced. As a result, the elution of a transition metal from the positive electrode active material caused by the action of hydrofluoric acid can be reduced.

By causing the hydrofluoric acid and the lithium phosphate to react with each other on the surface of the positive electrode active material, a protective film is formed (it is presumed that a film in which a fluorine-containing compound and a phosphorus-containing compound are mixed is formed) on the surface of the positive electrode active material. In the above-described method, the degree (dispersion degree) to which lithium phosphate is dispersed in the positive electrode mixture layer can be improved. Therefore, the protective film can be easily formed on each surface of the positive electrode active material in the positive electrode mixture layer. Due to the formation of the protective film, the oxidative decomposition of the solvent of the nonaqueous electrolytic solution on the surface of the positive electrode active material can be prevented even in a case where the potential of the positive electrode active material increases (for example, 4.35 V or higher) due to the charging of the battery.

The acidic binder (binder which is acidic when dissolved in a polar solvent such as water) is not particularly limited, and examples thereof include polyacrylic acid and alginic acid.

In the above-described method of manufacturing a nonaqueous electrolyte secondary battery, when preparing the positive electrode mixture paste, the acidic binder and a neutral binder may be used.

In a case where only the acidic binder is used during the preparation of the positive electrode mixture paste, the dispersibility of the positive electrode active material in the positive electrode mixture paste may deteriorate, and the internal resistance (IV resistance) of the nonaqueous electrolyte secondary battery may increase.

On the other hand, in the above-described method, when preparing the positive electrode mixture paste, the acidic binder and the neutral binder are used (added). In other words, the acidic binder and the neutral binder are used during the preparation of the positive electrode mixture paste. As a result, the dispersibility of the positive electrode active material in the positive electrode mixture paste can be improved, and the internal resistance (IV resistance) of the nonaqueous electrolyte secondary battery can be reduced.

Further, in the above-described method of manufacturing a nonaqueous electrolyte secondary battery, the acidic binder may be polyacrylic acid.

By using polyacrylic acid as the acidic binder added during the preparation of the positive electrode mixture paste, at least a portion of lithium phosphate can be made to appropriately dissolve in a liquid of the positive electrode mixture paste. As a result, the degree to which the lithium phosphate is dispersed in the positive electrode mixture layer, which is formed by drying the positive electrode mixture paste, can be appropriately improved.

In the above-described method of manufacturing a nonaqueous electrolyte secondary battery, the positive electrode active material may be a lithium nickel manganese oxide having a spinel structure.

In the above-described method, a lithium nickel manganese oxide having a spinel structure is used as the positive electrode active material. The crystal structure of the positive electrode active material is stable at a high potential (for example, 4.35 V or higher vs. lithium metal). Accordingly, by using the positive electrode active material, a nonaqueous electrolyte secondary battery capable of being stably used (that is, capable of stably obtaining a high output) even at a high voltage can be manufactured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Example 1

Figure 1:
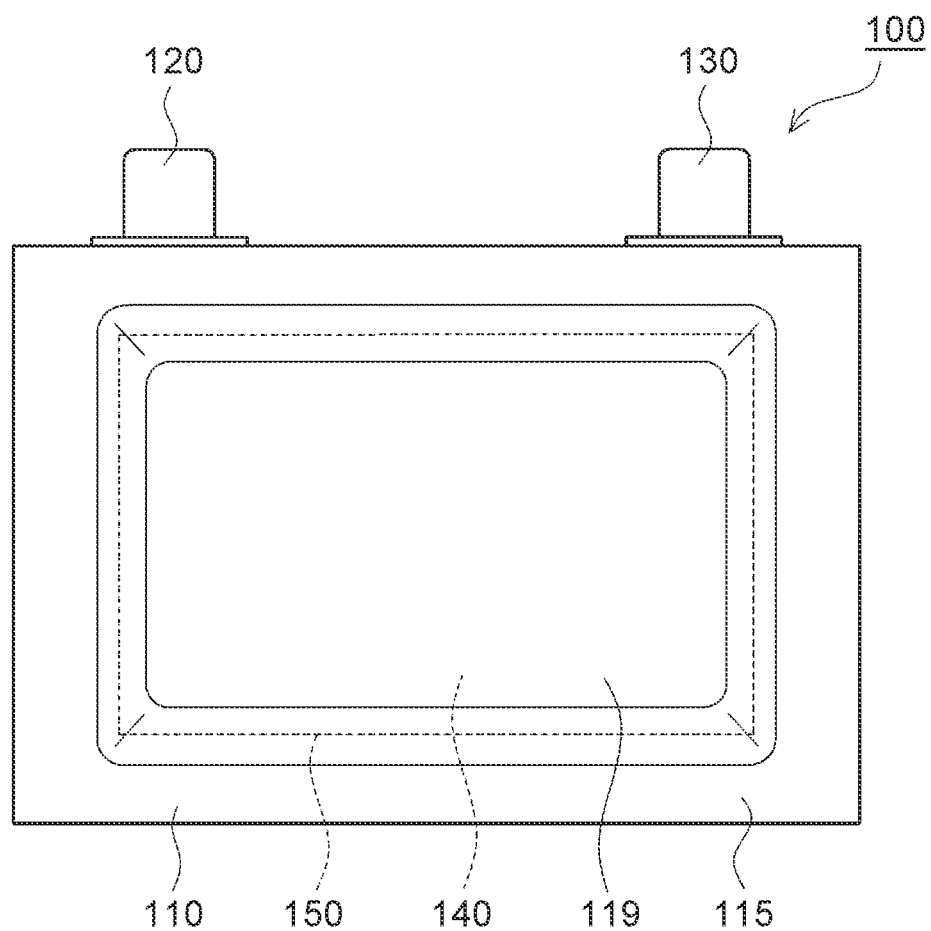
FIG. 1 is a plan view showing a nonaqueous electrolyte secondary battery according to Example 1.

Next, Example 1 will be described with reference to the drawings. FIG. 1 is a plan view showing a nonaqueous electrolyte secondary battery 100 according to Example 1. The nonaqueous electrolyte secondary battery 100 according to Example 1 is a lithium ion secondary battery and, as shown in FIG. 1, includes: a battery case 110 having a rectangular shape in a plan view; a positive electrode terminal 120 that extends from the inside to the outside of the battery case 110; and a negative electrode terminal 130 that extends from the inside to the outside of the battery case 110.

Figure 2:
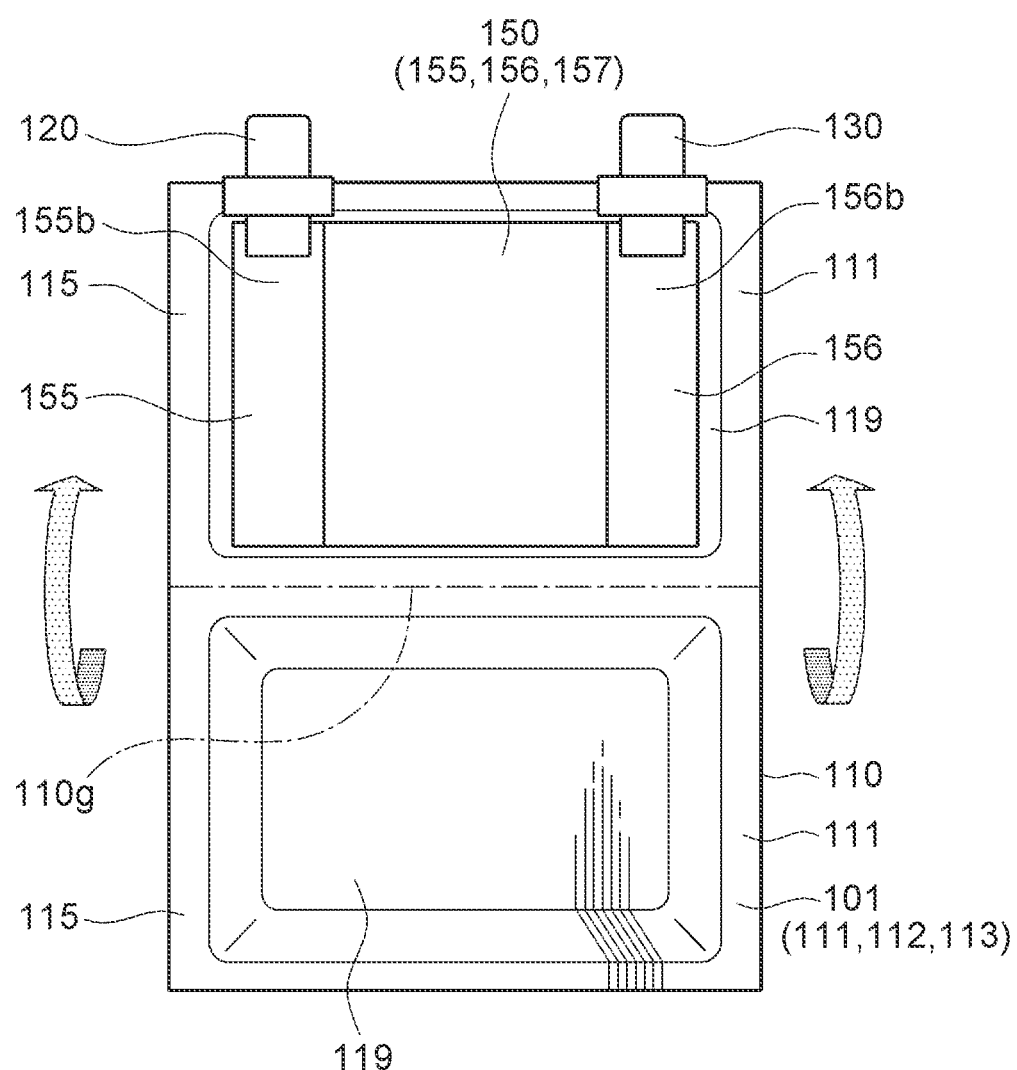
FIG. 2 is a diagram showing a method of manufacturing the nonaqueous electrolyte secondary battery according to Example 1.

The battery case 110 is formed of a laminate film 101 in which an inside resin film 111 that is positioned on the innermost side of the battery case 110, a metal film 112 that is positioned adjacent to the outside of the inside resin film 111 (depth side in FIG. 2), and an outside resin film 113 that is positioned adjacent to the outside of the metal film 112 are laminated (refer to FIG. 2). The battery case 110 is formed in a rectangular shape in a plan view by folding the laminate film 101, in which an electrode body 150 is disposed in an accommodation portion 119, at a folding position 110g as shown in FIG. 2 and sealing a rectangular ring-shaped welding sealing portion 115 (a peripheral edge portion of the battery case 110) by thermal welding as shown in FIG. 1.

Further, as shown in FIG. 2, the electrode body 150 is accommodated in the battery case 110. This electrode body 150 a flat wound body having an elliptical shape in section which is obtained by winding an elliptical sheet-shaped positive electrode 155, an elliptical sheet-shaped negative electrode 156, and a separator 157 in a flat shape.

Figure 3:
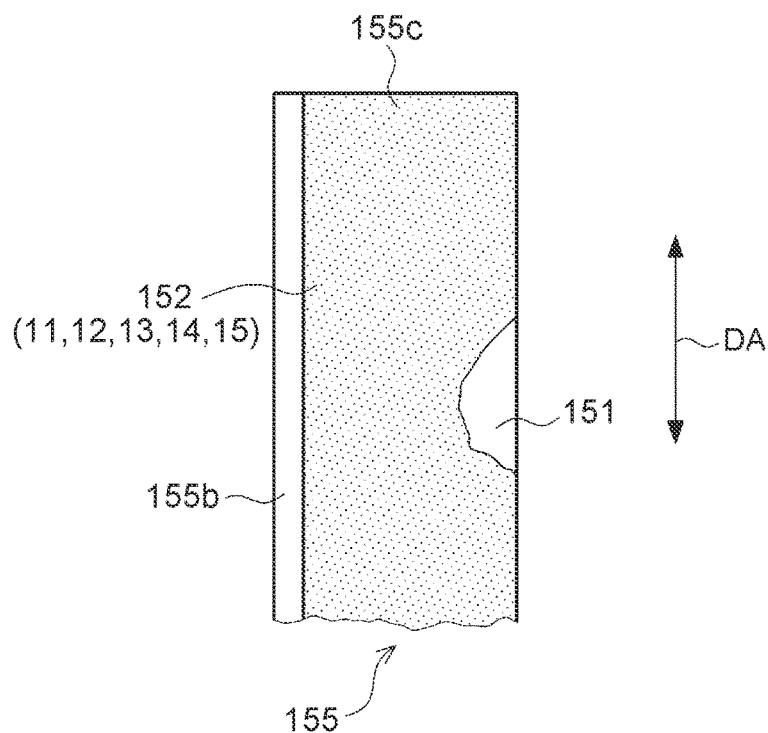
FIG. 3 is a diagram showing a configuration of a positive electrode.

As shown in FIG. 3, the positive electrode 155 includes: a positive electrode current collector member 151 that has a belt shape extending in a longitudinal direction DA and is formed of an aluminum foil; and two positive electrode mixture layers 152 that are disposed on both surfaces of the positive electrode current collector member 151 in a belt shape extending the longitudinal direction DA, respectively. The positive electrode mixture layer 152 includes: a positive electrode active material 11; a conductive material 12 that is formed of acetylene black; lithium phosphate 13; a neutral binder 14 that is formed of polyvinylidene fluoride (PVDF); and an acidic binder 15 that is formed of polyacrylic acid.

A portion of the positive electrode 155 on which the positive electrode mixture layer 152 is formed will be referred to as a positive electrode mixture layer-forming portion 155c. On the other hand, a portion of the positive electrode 155 on which only the positive electrode current collector member 151 is present without the positive electrode mixture layer 152 being formed will be referred to as a positive electrode mixture layer non-forming portion 155b. The positive electrode mixture layer non-forming portion 155b extends along one long side of the positive electrode 155 in a belt shape in the longitudinal direction DA of the positive electrode 155. The positive electrode mixture layer non-forming portion 155b is wound in a spiral shape and is positioned at one end portion (a left end portion in FIG. 2) of the electrode body 150 in an axis direction thereof (left-right direction in FIG. 2). The positive electrode terminal 120 is welded to the positive electrode mixture layer non-forming portion 155b.

In Example 1, a positive electrode active material containing a transition metal is used as the positive electrode active material 11. Specifically, a lithium nickel manganese oxide having a spinel structure (specifically, $LiNi_{0.5}Mn_{1.5}O_4$) is used as the positive electrode active material 11. The positive electrode active material 11 has an upper limit action potential of 4.35 V or higher vs. lithium metal. That is, the positive electrode active material 11 has a redox potential (action potential) of 4.35 V (vs. $Li/Li^+$) or higher in a case where the state of charge (SOC) of the nonaqueous electrolyte secondary battery 100 is in a range of 0% to 100%. Accordingly, the nonaqueous electrolyte secondary battery 100 including the positive electrode active material 11 has a region in which the potential of the positive electrode 155 (equivalent to the potential of the positive electrode active material 11) is 4.35 V (vs. $Li/Li^+$) or higher in a SOC region of 0% to 100%. In Example 1, the lithium nickel manganese oxide is used as the positive electrode active material 11. However, the kind of the positive electrode active material is not particularly limited. For example, as the positive electrode active material 11, a layered active material such as $LiMnO_2$ or $LiNi_{1/3}Co_{1/3}Mn_{1/3}O_2$, an active material having a spinel structure such as $LiMn_2O_4$, or an olivine-type active material such as $LiMnPO_4$ can be used.

Figure 4:
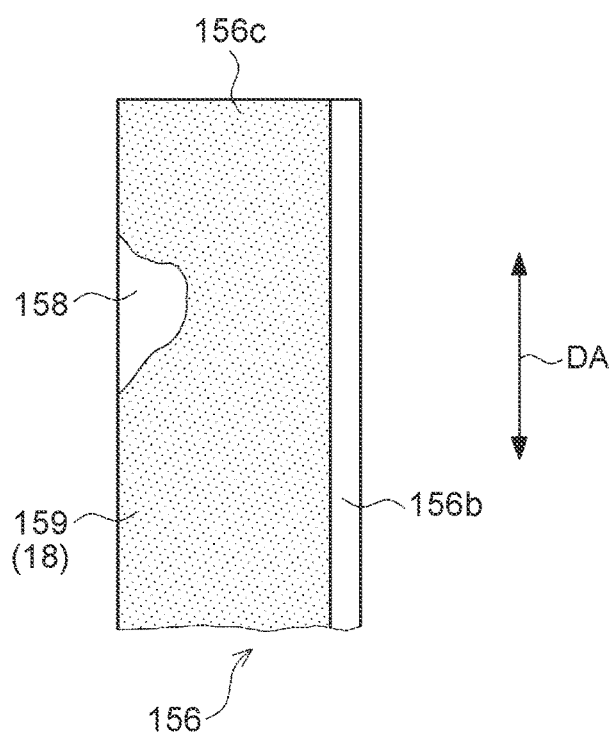
FIG. 4 is a diagram showing a configuration of a negative electrode.

As shown in FIG. 4, the negative electrode 156 includes: a negative electrode current collector member 158 that has a belt shape extending in the longitudinal direction DA and is formed of a copper foil; and two negative electrode mixture layers 159 that are disposed on both surfaces of the negative electrode current collector member 158 in a belt shape extending the longitudinal direction DA, respectively. The negative electrode mixture layer 159 includes a negative electrode active material 18 and a binder formed of PVDF. In Example 1, a carbon material (specifically, graphite) is used as the negative electrode active material 18.

A portion of the negative electrode 156 on which the negative electrode mixture layer 159 is formed will be referred to as a negative electrode mixture layer-forming portion 156c. On the other hand, a portion of the negative electrode 156 on which only the negative electrode current collector member 158 is present without the negative electrode mixture layer 159 being formed will be referred to as a negative electrode mixture layer non-forming portion 156b. The negative electrode mixture layer non-forming portion 156b extends along one long side of the negative electrode 156 in a belt shape in the longitudinal direction DA of the negative electrode 156. The negative electrode mixture layer non-forming portion 156b is wound in a spiral shape and is positioned at the other end portion (a right end portion in FIG. 2) of the electrode body 150 in the axis direction. The negative electrode terminal 130 is welded to the negative electrode mixture layer non-forming portion 156b.

The separator 157 is formed of an electrically insulating resin film. The separator 157 is interposed between the positive electrode 155 and the negative electrode 156 to separate them from each other. The separator 157 is dipped in a nonaqueous electrolytic solution 140.

In Example 1, a nonaqueous electrolytic solution containing a fluorine (F)-containing compound is used as the nonaqueous electrolytic solution 140. Specifically, in the nonaqueous electrolytic solution, lithium hexafluorophosphate ($LiPF_6$) which is a fluorine-containing compound is dissolved in a nonaqueous solvent in which ethylene carbonate (EC) and ethyl methyl carbonate (EMC) are mixed.

Figure 5:
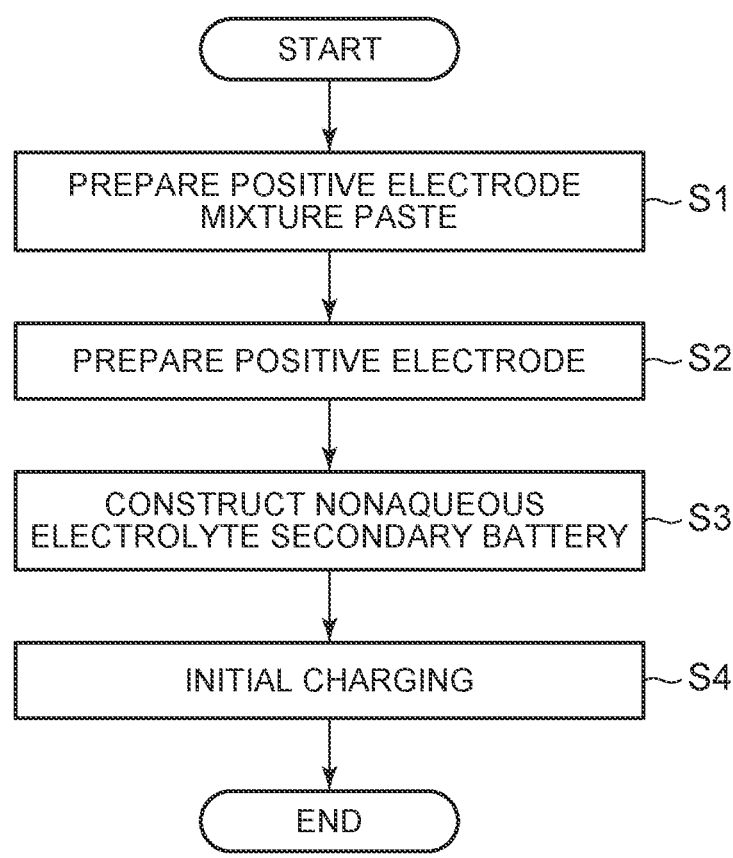
FIG. 5 is a flowchart showing the flow of the method of manufacturing the nonaqueous electrolyte secondary battery according to Example 1.
Figure 6:
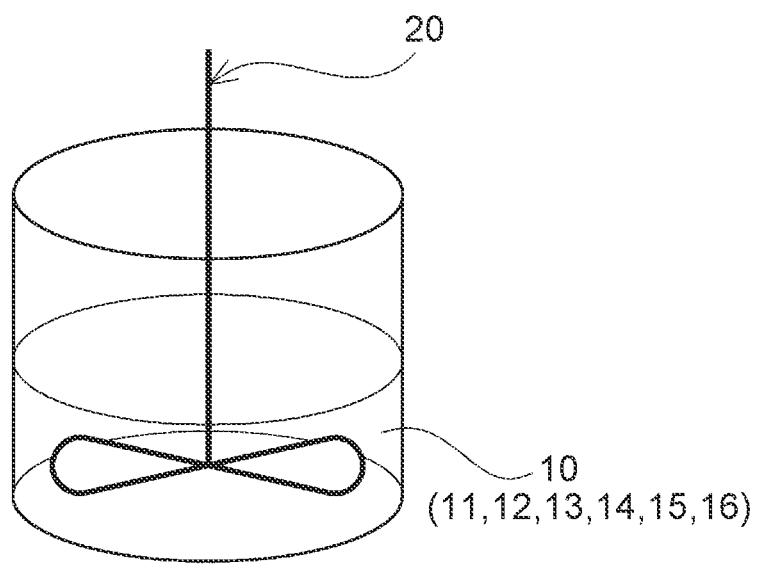
FIG. 6 is a diagram showing the method of manufacturing the nonaqueous electrolyte secondary battery according to Example 1.

Next, a method of manufacturing the nonaqueous electrolyte secondary battery according to Example 1 will be described. FIG. 5 is a flowchart showing the flow of the method of manufacturing the nonaqueous electrolyte secondary battery according to Example 1. First, in Step S1 (positive electrode mixture paste preparation step), a positive electrode mixture paste 10 is prepared. Specifically, as shown in FIG. 6, the positive electrode mixture paste 10 is obtained by kneading the positive electrode active material 11 ($LiNi_{0.5}Mn_{1.5}O_4$), the conductive material 12 (acetylene black), the lithium phosphate 13, the neutral binder 14 (PVDF), the acidic binder 15 (polyacrylic acid), and the solvent 16 (N-methyl-2-pyrrolidone (NMP)) with each other using a high-speed disperser 20.

In Step S1 (positive electrode mixture paste preparation step) of Example 1, a mixing ratio (weight ratio) of the positive electrode active material 11, the conductive material 12, the lithium phosphate 13, the neutral binder 14, and the acidic binder 15 is 87:8:3:1.9:0.1. The addition amount (0.1 wt %) of the acidic binder 15 corresponds to the amount in which, when (assuming that) the addition amount of the acidic binder 15 is dissolved in the same amount of water as that of the solvent 16 included in the positive electrode mixture paste 10 (the solvent 16 added in Step S1) to obtain an aqueous solution, a pH value of the aqueous solution is 5.5 (referred to as "the addition amount corresponding a value of 5.5 in terms of pH). In other words, assuming that the addition amount of the acidic binder 15 is dissolved in the same amount of water as that of the solvent 16 included in the positive electrode mixture paste 10 to obtain an aqueous solution, the addition amount of the acidic binder 15 in Example 1 corresponds to the amount in which the pH value of the aqueous solution is 5.5.

In Example 1, HOMOGENIZING DISPER (manufactured by Primix Corporation) is used as the high-speed disperser 20. During the kneading, the rotating speed of the high-speed disperser 20 is adjusted to a range of 2000 to 4000 rpm, and the viscosity of the positive electrode mixture paste 10 is adjusted to 2500 cp or higher.

Next, in Step S2, the positive electrode 155 is prepared. Specifically, the positive electrode mixture paste 10 prepared as described above is applied to a surface (both surfaces) of the positive electrode current collector member 151 (aluminum foil), is dried, and is pressed. As a result, the positive electrode 155 in which the positive electrode mixture layer 152 is formed on the surface (both surfaces) of the positive electrode current collector member 151 is obtained. The positive electrode mixture layer 152 is obtained by drying and pressing the positive electrode mixture paste 10.

Next, in Step S3, the nonaqueous electrolyte secondary battery 100 is constructed. Specifically, first, the positive electrode 155 which is prepared as described above, the negative electrode 156 which is prepared separately, and the separator 157 are wound such that the separator 157 is interposed between the positive electrode 155 and the negative electrode 156. As a result, the electrode body 150 is prepared. Specifically, the positive electrode 155, the negative electrode 156, and the separator 157 are wound in a flat shape such that the positive electrode mixture layer non-forming portion 155b of the positive electrode 155 and the negative electrode mixture layer non-forming portion 156b of the negative electrode 156 are positioned opposite to each other in the width direction (in FIGS. 2 to 4, the left-right direction). As a result, the electrode body 150 is formed.

Next, the positive electrode terminal 120 is joined (welded) to the positive electrode mixture layer non-forming portion 155b of the electrode body 150. Further, the negative electrode terminal 130 is joined (welded) to the negative electrode mixture layer non-forming portion 156b of the electrode body 150. Next, as shown in FIG. 2, the electrode body 150 to which the positive electrode terminal 120 and the negative electrode terminal 130 are welded is disposed in the accommodation portion 119 of the laminate film 101. Next, the laminate film 101 is folded at the folding position 110g, and the electrode body 150 is accommodated therein.

Next, the welding sealing portion 115 is heated while being pressed in the thickness direction such that the inside resin film 111 is thermally welded, thereby forming the battery case 110. Next, the nonaqueous electrolytic solution 140 is injected into the battery case 110 through a liquid injection hole (not shown) provided in the battery case 110, and the liquid injection hole is sealed. As a result, the construction of the nonaqueous electrolyte secondary battery 100 is completed.

Next, in Step S4, the nonaqueous electrolyte secondary battery 100 constructed as described above is initially charged. Specifically, the nonaqueous electrolyte secondary battery 100 is charged at a constant current value of 5 C until the SOC thereof reaches 100% (until the battery voltage value reaches 4.75 V). Due to this initial charging, the redox potential (action potential) of the positive electrode active material 11 is 4.35 V (vs. Li/Li$^+$) or higher. 1 C refers to a constant current value at which a battery having a nominal capacity (rated capacity) is completely discharged after 1 hour. 5 C refers to a current value which is five times 1 C. Next, by performing a predetermined treatment, the nonaqueous electrolyte secondary battery 100 is completed.

In Example 1, as described above, at least one binder including the acidic binder 15 (specifically, polyacrylic acid) are used in Step S1 (positive electrode mixture paste preparation step). In other words, a portion of the at least one binder used in the positive electrode mixture paste preparation step is the acidic binder 15 (specifically, polyacrylic acid).

In this way, by adding the acidic binder 15 in the positive electrode mixture paste preparation step, the acidic binder 15 can make at least a portion of the lithium phosphate 13 dissolve in a liquid of the positive electrode mixture paste 10. By adjusting at least a portion of the lithium phosphate 13 to dissolve in the liquid, the dispersibility of the lithium phosphate 13 in the positive electrode mixture paste 10 can be improved. That is, as compared to a positive electrode mixture paste (for example, the positive electrode mixture paste disclosed in JP 2014-103098 A) which is prepared using only a neutral binder without adding the acidic binder 15, the dispersibility of the lithium phosphate 13 in the positive electrode mixture paste 10 can be improved, and the lithium phosphate 13 can be dispersed (can be uniformly dispersed with reduced unevenness) over the entire region of the positive electrode mixture paste 10.

As a result, the degree to which the lithium phosphate 13 is dispersed in the positive electrode mixture layer 152, which is formed by drying the positive electrode mixture paste 10, can be improved. That is, as compared to a positive electrode mixture layer (for example, the positive electrode mixture layer disclosed in JP 2014-103098 A) which is prepared using only a neutral binder without adding the acidic binder 15, the dispersibility of the lithium phosphate 13 in the positive electrode mixture layer 152 can be improved, and the lithium phosphate 13 can be dispersed (can be uniformly dispersed with reduced unevenness) over the entire region of the positive electrode mixture layer 152.

As a result, in the step (Step S5) of initially charging the nonaqueous electrolyte secondary battery 100, the solvent (ethylene carbonate and the like) in the nonaqueous electrolytic solution 140 is oxidized and decomposed on a surface of the positive electrode active material 11, and in a case where hydrogen ions produced by the oxidative decomposition react with fluorine ions in the nonaqueous electrolytic solution 140 to produce hydrofluoric acid (HF), the probability that the produced hydrofluoric acid and the lithium phosphate 13 react with each other can be improved, and the amount of the produced hydrofluoric acid can be effectively reduced. As a result, the elution of a transition metal (Mn) from the positive electrode active material 11 caused by the action of hydrofluoric acid can be reduced.

By causing the hydrofluoric acid and the lithium phosphate 13 to react with each other on the surface of the positive electrode active material 11, a protective film is formed (it is presumed that a film in which a fluorine-containing compound and a phosphorus-containing compound are mixed is formed) on the surface of the positive electrode active material 11. In Example 1, the degree to which the lithium phosphate 13 is dispersed in the positive electrode mixture layer 152 can be improved. Therefore, the protective film can be easily formed on each surface of the positive electrode active material 11 in the positive electrode mixture layer 152. Due to the formation of the protective film, the oxidative decomposition of the solvent of the nonaqueous electrolytic solution 140 on the surface of the positive electrode active material 11 can be prevented even in a case where the potential of the positive electrode active material 11 increases (for example, 4.35 V or higher) due to the charging of the nonaqueous electrolyte secondary battery 100. As a result, the elution of a transition metal (Mn) from the positive electrode active material 11 can be reduced.

Examples 2 and 3

Next, Examples 2 and 3 will be described. In Examples 2 and 3, the nonaqueous electrolyte secondary battery 100 is manufactured under the same conditions as in Example 1, except that the mixing ratio (weight ratio) of the raw materials (solid content) used during the preparation of the positive electrode mixture paste 10 in Step S1 (positive electrode mixture paste preparation step) is changed.

More specifically, in Examples 2 and 3, as in the case of Example 1, in Step S1 (positive electrode mixture paste preparation step), the positive electrode mixture paste 10 is obtained by kneading the positive electrode active material 11 ($LiNi_{0.5}Mn_{1.5}O_4$), the conductive material 12 (acetylene black), the lithium phosphate 13, the neutral binder 14 (PVDF), the acidic binder 15 (polyacrylic acid), and the solvent 16 (NMP) with each other using the high-speed disperser 20.

In Example 2, the mixing ratio (weight ratio) of the positive electrode active material 11, the conductive material 12, the lithium phosphate 13, the neutral binder 14, and the acidic binder 15 is 87:8:3:1.7:0.3, and the addition amount (content) of the acidic binder 15 is more than that of Example 1. The addition amount (0.3 wt %) of the acidic binder 15 in Example 2 corresponds to the amount in which, when (assuming that) the addition amount of the acidic binder 15 is dissolved in the same amount of water as that of the solvent 16 included in the positive electrode mixture paste 10 (the solvent 16 added in Step S1) to obtain an aqueous solution, a pH value of the aqueous solution is 3.0 (referred to as "the addition amount corresponding a value of 3.0 in terms of pH).

In Example 3, the mixing ratio (weight ratio) of the positive electrode active material 11, the conductive material 12, the lithium phosphate 13, the neutral binder 14, and the acidic binder 15 is 87:8:3:1.0:1.0, and the addition amount (content) of the acidic binder 15 is more than those of Examples 1 and 2. The addition amount (1.0 wt %) of the acidic binder 15 in Example 3 corresponds to the amount in which, when (assuming that) the addition amount of the acidic binder 15 is dissolved in the same amount of water as that of the solvent 16 included in the positive electrode mixture paste 10 (the solvent 16 added in Step S1) to obtain an aqueous solution, a pH value of the aqueous solution is 1.7 (referred to as "the addition amount corresponding a value of 1.7 in terms of pH).

In Examples 2 and 3, by adding the acidic binder 15 in the positive electrode mixture paste preparation step (Step S1), the dispersibility of the lithium phosphate 13 in the positive electrode mixture paste 10 can be improved. As a result, the degree to which the lithium phosphate 13 is dispersed in the positive electrode mixture layer 152, which is formed by drying the positive electrode mixture paste 10, can be improved. This effect can be clearly verified from the results of an evaluation test described below.

Comparative Example 1

In Comparative Example 1, unlike Example 1, in the positive electrode mixture paste preparation step, a positive electrode mixture paste is prepared by using only the neutral binder 14 (PVDF) without adding the acidic binder 15 (polyacrylic acid). Specifically, the positive electrode mixture paste is obtained by kneading the positive electrode active material 11 ($LiNi_{0.5}Mn_{1.5}O_4$), the conductive material 12 (acetylene black), the lithium phosphate 13, the neutral binder 14 (PVDF), and the solvent 16 (NMP) with each other using the high-speed disperser 20. In Comparative Example 1, the mixing ratio (weight ratio) of the positive electrode active material 11, the conductive material 12, the lithium phosphate 13, the neutral binder 14, and the acidic binder 15 is 87:8:3:2:0. A nonaqueous electrolyte secondary battery according to Comparative Example 1 is prepared under the same conditions as those of Example 1 except for the above-described configuration.

Comparative Example 2

In Comparative Example 2, unlike Example 1, in the positive electrode mixture paste preparation step (Step S1), a positive electrode mixture paste is prepared by using only the acidic binder 15 (polyacrylic acid) without adding the neutral binder 14 (PVDF). Specifically, the positive electrode mixture paste 10 is obtained by kneading the positive electrode active material 11 ($LiNi_{0.5}Mn_{1.5}O_4$), the conductive material 12 (acetylene black), the lithium phosphate 13, the acidic binder 15 (polyacrylic acid), and the solvent 16 (NMP) with each other using the high-speed disperser 20.

In Comparative Example 2, the mixing ratio (weight ratio) of the positive electrode active material 11, the conductive material 12, the lithium phosphate 13, the neutral binder 14, and the acidic binder 15 is 87:8:3:0:2.0. The addition amount (2.0 wt %) of the acidic binder 15 in Comparative Example 2 corresponds to the amount in which, when (assuming that) the addition amount of the acidic binder 15 is dissolved in the same amount of water as that of the solvent 16 included in the positive electrode mixture paste 10 (the solvent 16 added in Step S1) to obtain an aqueous solution, a pH value of the aqueous solution is 1.2 (referred to as "the addition amount corresponding a value of 1.2 in terms of pH).

Comparative Example 3

In Comparative Example 3, the nonaqueous electrolyte secondary battery 100 is manufactured under the same conditions as in Example 1, except that the mixing ratio (weight ratio) of the raw materials (solid content) used during the preparation of the positive electrode mixture paste 10 in Step S1 (positive electrode mixture paste preparation step) is changed. Specifically, in Comparative Example 3, the mixing ratio (weight ratio) of the positive electrode active material 11, the conductive material 12, the lithium phosphate 13, the neutral binder 14, and the acidic binder 15 is 87:7:3:1.0:2.0, and the addition amount (content) of the acidic binder 15 is more than those of Examples 1 to 3. The addition amount (2.0 wt %) of the acidic binder 15 in Comparative Example 3 corresponds to the amount in which, when (assuming that) the addition amount of the acidic binder 15 is dissolved in the same amount of water as that of the solvent 16 included in the positive electrode mixture paste 10 (the solvent 16 added in Step S1) to obtain an aqueous solution, a pH value of the aqueous solution is 1.2 (referred to as "the addition amount corresponding a value of 1.2 in terms of pH").

(Evaluation Test)

Next, the internal resistance of each of the nonaqueous electrolyte secondary batteries according to Examples 1 to 3 and Comparative Examples 1 to 3 was measured. In this test, an IV resistance value was measured as the internal resistance of the battery. Specifically, the SOC of each of the nonaqueous electrolyte secondary batteries was adjusted to 60%, and then the battery was discharged at a constant current value of 1 C for 10 seconds in a temperature environment of 25° C. After completion of discharging, the battery voltage value was measured. Further, the battery was discharged for 10 seconds under the same conditions as described above, except that only the discharge current value was changed to 3 C, 5 C, or 10 C. After completion of 10 seconds of discharging at the discharge current value, the battery voltage value was measured.

Next, data of each of the nonaqueous electrolyte secondary batteries obtained in the above-described discharging were plotted on a coordinate plane in which the horizontal axis represents the discharge current value and the vertical axis represents the battery voltage value at the completion of the discharging. Based on the plotted data of each of the nonaqueous electrolyte secondary batteries, an approximation straight line (linear) was calculated using a least-square method. The slope of the approximation straight line was obtained as an IV resistance value of each of the nonaqueous electrolyte secondary batteries. The results are shown in Table 1.

cannot be improved, and thus the degree to which the lithium phosphate 13 is dispersed in the positive electrode mixture layer cannot be improved. In a case where the kneading (stirring) energy for the positive electrode mixture paste is increased in order to improve the dispersibility of the lithium phosphate 13, the positive electrode active material may crack. Therefore, the method of increasing the kneading (stirring) energy to improve the dispersibility of the lithium phosphate 13 cannot be adopted.

It is presumed that, since the degree to which the lithium phosphate 13 is dispersed in the positive electrode mixture layer is poor (the lithium phosphate 13 is not uniformly dispersed in the positive electrode mixture layer to some extent), the internal resistance (IV resistance value) of the nonaqueous electrolyte secondary battery is increased. Specifically, the following is presumed.

In a case where the potential of the positive electrode active material 11 is high (for example, 4.35 V or higher) during initial charging, the hydrofluoric acid (HF) and the lithium phosphate 13 react with each other on the surface of the positive electrode active material 11, and thus a protective film is formed (it is presumed that a film in which a fluorine-containing compound and a phosphorus-containing compound are mixed is formed) on the surface of the positive electrode active material 11. Hydrofluoric acid is produced by hydrogen ions, which are produced by the oxidative decomposition of the solvent of the nonaqueous electrolytic solution on the surface of the positive electrode active material 11, reacting with fluorine ions in the nonaqueous electrolytic solution. By forming the protective film, the oxidative decomposition of the solvent of the nonaqueous electrolytic solution 140 on the surface of the positive electrode active material 11 is prevented, and the production of hydrofluoric acid can be prevented.

TABLE 1

| | Mixing Ratio (wt %) | | | | | Value in Terms of pH | IV Resistance Value (mΩ) |
|---|---|---|---|---|---|---|---|
| | Positive Electrode Active Material | Conductive Material | LPO | Neutral Binder | Acidic Binder | | |
| Example 1 | 87 | 8 | 3 | 1.9 | 0.1 | 5.5 | 500 |
| Example 2 | 87 | 8 | 3 | 1.7 | 0.3 | 3.0 | 503 |
| Example 3 | 87 | 8 | 3 | 1.0 | 1.0 | 1.7 | 523 |
| Comparative Example 1 | 87 | 8 | 3 | 2.0 | 0 | 7.0 | 570 |
| Comparative Example 2 | 87 | 8 | 3 | 0 | 2.0 | 1.2 | 600 |
| Comparative Example 3 | 87 | 7 | 3 | 1.0 | 2.0 | 1.2 | 551 |

As shown in Table 1, the IV resistance value of the nonaqueous electrolyte secondary battery according to Comparative Example 1 was 570 mΩ. On the other hand, the IV resistance values of the nonaqueous electrolyte secondary batteries according to Examples 1 to 3 were 500 mΩ to 523 mΩ which were lower than the IV resistance value of Comparative Example 1 by 47 mΩ or higher. The reason for the above result is presumed to be as follows.

In Comparative Example 1, in the positive electrode mixture paste preparation step, a positive electrode mixture paste is prepared by using only the neutral binder 14 (PVDF) without adding the acidic binder 15 (polyacrylic acid). Therefore, it is presumed that the dispersibility of the lithium phosphate 13 in the positive electrode mixture paste 10

However, in Comparative Example 1, the dispersion degree of the lithium phosphate 13 is poor. Therefore, it is presumed that, during initial charging, a long period of time is required to form the protective film on the surface of the positive electrode active material 11, and thus a large amount of hydrofluoric acid is produced. It is presumed that, by the large amount of hydrofluoric acid reacting with the lithium phosphate 13, the thickness of the protective film formed on the surface of the positive electrode active material 11 is increased, and thus the internal resistance (IV resistance) of the nonaqueous electrolyte secondary battery is increased. The reason for this is that, in a case where the thickness of the protective film increases, the Li ion conductivity of the protective film decreases, and the internal resistance of the battery increases.

On the other hand, in Examples 1 to 3, the at least one binder including the acidic binder 15 (specifically, polyacrylic acid) is used in the positive electrode mixture paste preparation step (Step S1). In other words, a portion of the at least one binder used in the positive electrode mixture paste preparation step is the acidic binder 15 (specifically, polyacrylic acid).

As a result, the acidic binder 15 can make at least a portion of the lithium phosphate 13 dissolve in a liquid of the positive electrode mixture paste 10. Therefore, the dispersibility of the lithium phosphate 13 in the positive electrode mixture paste 10 can be improved. As a result, the degree to which the lithium phosphate 13 is dispersed in the positive electrode mixture layer 152, which is formed by drying the positive electrode mixture paste 10, can be improved.

Therefore, in a case where hydrofluoric acid (HF) is produced on the surface of the positive electrode active material 11 due to the initial charging of the nonaqueous electrolyte secondary battery 100, the probability that the hydrofluoric acid and the lithium phosphate 13, which is dispersed in the surface of the positive electrode active material 11 (or near the surface thereof), react with each other increases (the hydrofluoric acid and the lithium phosphate rapidly react with each other). As a result, a protective film is rapidly formed (it is presumed that a film in which a fluorine-containing compound and a phosphorus-containing compound are mixed is formed) on the surface of the positive electrode active material 11. Therefore, as compared to Comparative Example 1, the amount of hydrofluoric acid produced can be reduced, and thus the thickness of the protective film can be reduced. As a result, it is presumed that the internal resistance (IV resistance) of each of the nonaqueous electrolyte secondary batteries 100 according to Examples 1 to 3 can be reduced.

However, in Comparative Example 2, although the at least one binder including the acidic binder 15 (specifically, polyacrylic acid) are used, the IV resistance value is 600 mΩ which is higher than the internal resistance (IV resistance value) of Comparative Example 1 in which the binder other than the acidic binder 15 (specifically, only the neutral binder 14) is used. The reason for this is presumed to be as follows.

By adding the acidic binder 15 in the positive electrode mixture paste preparation step, the dispersibility of the lithium phosphate 13 in the positive electrode mixture paste 10 can be improved. However, as the addition amount of the acidic binder 15 increases (that is, as the value in terms of pH decreases), a transition metal (specifically Mn) is likely to be eluted from the positive electrode active material 11 due to the action of the acidic binder 15. Therefore, it is presumed that, in a case where the addition amount of the acidic binder 15 is excessively large (that is, as the value in terms of pH is excessively small), a transition metal (specifically, Mn) is eluted from the positive electrode active material 11, and thus the internal resistance (IV resistance value) of the battery increases. However, in a case where the addition amount of the acidic binder 15 is excessively small (that is, as the value in terms of pH is excessively large), the dispersibility of lithium phosphate in the positive electrode mixture paste cannot be appropriately improved, and the internal resistance (IV resistance value) of the battery may not be reduced.

According to the investigation on the results of Table 1, in Examples 1 to 3 in which the value in terms of pH is in a range of 1.7 to 5.5, the IV resistance value is 523 mΩ, or lower, and the internal resistance (IV resistance value) of the battery can be sufficiently reduced as compared to Comparative Example 1. On the other hand, in Comparative Example 2 in which the value in terms of pH is 1.2, the IV resistance value is 600 mΩ, and the internal resistance (IV resistance value) of the battery is higher than that of Comparative Example 1.

It can be said from the above results that, by adjusting the value in terms of pH to be in a range of 1.7 to 5.5, the degree to which lithium phosphate is dispersed in the positive electrode mixture layer can be improved, the elution of a transition metal from the positive electrode active material can be reduced, and thus the internal resistance (IV resistance) of the nonaqueous electrolyte secondary battery can be reduced. In other words, by adjusting, when (assuming that) the addition amount of the acidic binder 15 is dissolved in the same amount of water as that of the solvent 16 included in the positive electrode mixture paste 10 in the positive electrode mixture paste preparation step (the solvent 16 added in positive electrode mixture paste preparation step) to obtain an aqueous solution, a pH value of the aqueous solution to be in a range of 1.7 to 5.5, the dispersibility of the lithium phosphate 13 in the positive electrode mixture paste 10 can be improved, the elution of a transition metal from the positive electrode active material can be reduced, and thus the internal resistance (IV resistance) of the nonaqueous electrolyte secondary battery can be reduced.

In particular, in Examples 1 and 2, the IV resistance value is about 500 mΩ, and the internal resistance (IV resistance value) of the battery can be extremely reduced. It can be said from the result that, by adjusting the value in terms of pH to be in a range of 3.0 to 5.5, the internal resistance (IV resistance) of the nonaqueous electrolyte secondary battery can be extremely reduced. In other words, by adjusting, when (assuming that) the addition amount of the acidic binder is dissolved in the same amount of water as that of the solvent 16 included in the positive electrode mixture paste 10 in the positive electrode mixture paste preparation step (the solvent 16 added in Step S1) to obtain an aqueous solution, a pH value of the aqueous solution to be in a range of 3.0 to 5.5, the internal resistance (IV resistance) of the nonaqueous electrolyte secondary battery can be extremely reduced.

Next, the results of Comparative Examples 2 and 3 are compared to each other. In Comparative Example 2, only the acidic binder 15 is used. On the other hand, in Comparative Example 3, both of the neutral binder 14 and the acidic binder 15 are used. In addition, in Comparative Example 2, the proportion of the binder in the positive electrode mixture paste (solid content) is 2.0 wt %. In Comparative Example 3, the proportion of the binders (the total proportion of the neutral binder 14 and the acidic binder 15) in the positive electrode mixture paste (solid content) is 3.0 wt %, which is higher than that of Comparative Example 2. Comparative Examples 2 and 3 are the same as each other except for the above-described point. Accordingly, in Comparative Examples 2 and 3, the addition amounts of the acidic binder 15 are the same, and the values in terms of pH are the same.

In general, as the addition amount of a binder increases, the internal resistance (IV resistance value) of the battery increases. In Comparative Examples 2 and 3, since the addition amounts of the acidic binder 15 are the same (that is, the values in terms of pH are the same), it is presumed that the degrees to which lithium phosphate is dispersed in the positive electrode mixture layer are also the same. Accordingly, in a case where Comparative Examples 2 and 3 are compared to each other, it is presumed that the IV resistance value of Comparative Example 2 in which the addition amount of the binder is small is lower than that of Comparative Example 3 in which the addition amount of the binder is large.

However, in Comparative Example 2 in which the addition amount of the binder is small, the IV resistance value is 600 mΩ. On the other hand, in Comparative Example 3 in which the addition amount of the binder is large, the IV resistance value is 551 mΩ, which is lower than that of Comparative Example 2 by 50 mΩ. The reason for this is presumed to be as follows.

In Comparative Example 2, only the acidic binder 15 is used in the positive electrode mixture paste preparation step. On the other hand, in Comparative Example 3, both of the neutral binder 14 and the acidic binder 15 are used in the positive electrode mixture paste preparation step. Specifically, in Comparative Example 3 in which the neutral binder 14 and the acidic binder 15 are used in the positive electrode mixture paste preparation step, the dispersibility of the positive electrode active material 11 in the positive electrode mixture paste 10 can be improved, and thus the internal resistance (IV resistance) of the nonaqueous electrolyte secondary battery can be reduced as compared to Comparative Example 2 in which only the acidic binder is used in the positive electrode mixture paste preparation step. That is, the neutral binder 14 has a function of improving the dispersibility of the positive electrode active material 11 in the positive electrode mixture paste 10.

It can be said that, by using (adding) both of the acidic binder and the neutral binder in the positive electrode mixture paste preparation step, the dispersibility of the positive electrode active material in the positive electrode mixture paste can be improved, and the internal resistance (IV resistance) of the nonaqueous electrolyte secondary battery can be reduced as compared to a case where only the acidic binder is used in the positive electrode mixture paste preparation step.

Hereinabove, the disclosure has been described using Examples 1 to 3. However, the disclosure is not limited to Examples 1 to 3 described above, and appropriate modifications can be made within a range not departing from the scope of the disclosure.

What is claimed is:

1. A method of manufacturing a nonaqueous electrolyte secondary battery, the method comprising:
    preparing a positive electrode mixture paste by kneading a positive electrode active material, a conductive material, a solvent, at least one binder, and lithium phosphate, the at least one binder including an acidic binder in an amount set such that a pH value of an aqueous solution obtained by dissolving the set amount of acidic binder in the same amount of water as that of the solvent is within a range of 1.7 to 5.5;
    preparing a positive electrode including a positive electrode mixture layer formed on a surface of a current collector member by applying the positive electrode mixture paste to the surface of the current collector member and drying the positive electrode mixture paste;
    constructing the nonaqueous electrolyte secondary battery by accommodating the positive electrode, a negative electrode, and a nonaqueous electrolytic solution containing a fluorine-containing compound in a battery case; and
    charging the nonaqueous electrolyte secondary battery.

2. The method according to claim 1, wherein when preparing the positive electrode mixture paste, the at least one binder includes a neutral binder.

3. The method according to claim 1, wherein the acidic binder is polyacrylic acid.

4. The method according to claim 1, wherein the positive electrode active material is a lithium nickel manganese oxide having a spinel structure.

5. The method according to claim 1, wherein the lithium phosphate is $Li_3PO_4$.

6. The method according to claim 1, wherein an amount of the acidic binder is 0.1 wt % to 0.3 wt % in a solid content of the positive electrode mixture paste.

* * * * *